United States Patent
Oyanagi et al.

(10) Patent No.: US 9,139,772 B2
(45) Date of Patent: Sep. 22, 2015

(54) LIQUID COMPOSITION, INK JET RECORDING METHOD, INK JET RECORDING APPARATUS AND RECORDED ARTICLE

(71) Applicant: Seiko Epson Corporation, Tokyo (JP)

(72) Inventors: Takashi Oyanagi, Shiojiri (JP); Keitaro Nakano, Matsumoto (JP)

(73) Assignee: Seiko Epson Corporation (JP)

( * ) Notice: Subject to any disclaimer, the term of this patent is extended or adjusted under 35 U.S.C. 154(b) by 291 days.

(21) Appl. No.: 13/854,422

(22) Filed: Apr. 1, 2013

(65) Prior Publication Data

US 2013/0222468 A1     Aug. 29, 2013

Related U.S. Application Data

(62) Division of application No. 11/975,998, filed on Oct. 23, 2007, now abandoned.

(30) Foreign Application Priority Data

Oct. 30, 2006  (JP) .................. 2006-294616
Jun. 27, 2007  (JP) .................. 2007-168536

(51) Int. Cl.
| C09K 15/08 | (2006.01) |
| B41J 11/00 | (2006.01) |
| B41M 5/00 | (2006.01) |
| C09D 11/101 | (2014.01) |
| B41M 7/00 | (2006.01) |

(52) U.S. Cl.
CPC .............. *C09K 15/08* (2013.01); *B41J 11/002* (2013.01); *B41M 5/0023* (2013.01); *B41M 7/0081* (2013.01); *C09D 11/101* (2013.01)

(58) Field of Classification Search
CPC ............ B41J 2/01; B41J 2/101; C09D 11/30; C09D 11/101
See application file for complete search history.

(56) References Cited

U.S. PATENT DOCUMENTS

| 4,838,938 A | 6/1989 | Tomida et al. | |
| 5,043,363 A * | 8/1991 | Noguchi et al. | ................. 522/95 |
| 5,086,307 A * | 2/1992 | Noguchi et al. | ................. 347/65 |
| 5,378,775 A | 1/1995 | Shimizu et al. | |
| 5,631,307 A * | 5/1997 | Tanaka et al. | ................... 522/25 |
| 2005/0018023 A1 | 1/2005 | Momose et al. | |
| 2006/0092254 A1 | 5/2006 | Claes et al. | |
| 2006/0160917 A1 | 7/2006 | Oyanagi et al. | |
| 2008/0124483 A1 | 5/2008 | Takabayashi | |

FOREIGN PATENT DOCUMENTS

| EP | 1 621 348 A1 | 2/2006 |
| JP | 63-199782 | 8/1988 |
| JP | 64-013142 | 1/1989 |
| JP | 02-004804 | 1/1990 |
| JP | 03-087744 | 4/1991 |
| JP | 07-228811 | 8/1995 |
| JP | 10-130555 | 5/1998 |
| JP | 10-140061 | 5/1998 |
| JP | 2002-137535 | 5/2002 |
| JP | 2006-150665 | 6/2006 |
| WO | 00/10933 | 3/2000 |
| WO | 03/061849 | 7/2003 |
| WO | 2006/038458 | 4/2006 |
| WO | 2006/090540 | 9/2006 |

OTHER PUBLICATIONS

Photopolymer conwakaihen "Photopolymer Handbook" Kogyo Chosakai Publishing Co., Ltd., (1989), pp. 39-56.
Patent Abstracts of Japan of JP 2006-150665 dated Jun. 15, 2006.
Patent Abstracts of Japan of JP 64-013142 dated Jan. 18, 1989.
Patent Abstracts of Japan of JP 02-004804 dated Jan. 9, 1990.
English translation of WO 2006/090540.
Computer-generated English translation of JP 10-140061.
Computer-generated English translation of JP 10-130555.
English Patent Abstract of Japanese Application No. 2002-137535 published May 14, 2002.

* cited by examiner

*Primary Examiner* — Melvin C Mayes
*Assistant Examiner* — Colette Nguyen
(74) *Attorney, Agent, or Firm* — Harness, Dickey & Pierce, P.L.C.

(57) ABSTRACT

A liquid composition including: a radical polymerization inhibitor; a solvent; and a surfactant, wherein the content of the radical polymerization inhibitor is 0.1 to 50% by weight.

4 Claims, No Drawings

LIQUID COMPOSITION, INK JET RECORDING METHOD, INK JET RECORDING APPARATUS AND RECORDED ARTICLE

CROSS-REFERENCE TO RELATED APPLICATIONS

This application is a divisional application of U.S. application Ser. No. 11/975,998 filed Oct. 23, 2007, now abandoned, and claims priority from Japanese Patent Application No. 2006-294616, filed Oct. 30, 2006, and Japanese Patent Application No. 2007-168536, filed Jun. 27, 2007, all of which are incorporated herein by reference in their entireties.

BACKGROUND

1. Technical Field

The present invention relates to a liquid composition, an ink jet recording method, an ink jet recording apparatus, and a recorded article, and more particularly, to a liquid composition that prevents problems caused by unnecessary curing reactions of photo curable ink compositions, an ink jet recording method, an ink jet recording apparatus and a recorded article.

2. Related Art

In the case of preparing a pigment ink composition for ink jet printing, the pigment is typically subjected to dispersion treatment using a dispersion apparatus and treated so that pigment in the ink composition is stably dispersed. In photo-curing pigment ink compositions, although a polymerizable compound referred to as a monomer is used for the ink solvent, it is extremely difficult to carry out dispersion treatment on this monomer together with the pigment. The reason for this is that the monomer begins to undergo a polymerization reaction due to heat generated during dispersion treatment and mechanochemically generated radicals, thereby resulting in undesirable phenomena such as increased viscosity and gelling.

In addition, in ink compositions containing a polymerizable compound referred to as a monomer, increases in viscosity and gelling are known to inevitably progress due to dark reactions occurring when storing for long periods of time.

In order to improve on these problems, there are liquid compositions and ink jet recording methods that inhibit monomer polymerization reactions by adding a polymerization inhibitor. For example, it is disclosed to the effect that a colorant can be contained in either a solution containing a polymerizable compound and a photopolymerization initiator in a recording medium (solution 1) or a solution containing a polymerization inhibitor (solution 2) to prepare an ink, followed by carrying out printing by adhering solution 1 and then adhering solution 2 to efficiently carrying out a curing reaction, while the improvement of storage stability of an ink composition is also disclosed (JP-A-2006-150665).

SUMMARY

Although these methods can be used to inhibit unnecessary polymerization reactions during a storage period, in addition to these reactions it is also necessary to inhibit unnecessary polymerization reactions in the various mechanisms and components of recording apparatuses.

Photo curable ink compositions using radical polymerization reactions may be consumed in printing applications as well as applications other than printing in ink jet recording apparatuses. For example, they may be consumed as a result of being discharged onto the cap member or the head or an ink absorbent in the form of a sponge during flushing treatment for performing nozzle maintenance, consumed as a result of being aspirated with a pump due to cleaning, consumed as a result of adhering to the wiper blade, or in the case of borderless printing, may be consumed as a result of being discharged onto an ink absorbent in the form of a sponge of a non-printed area.

However, since photo curable ink compositions have the property of being cured when exposed to light such as ultraviolet light, if the cap member of a head, pump line, wiper blade or ink absorbent in the form of a sponge of a non-printed area to which a photo curable ink composition is adhered is exposed is irradiated with ultraviolet light, the photo curable ink composition is cured, thereby resulting in the problem of impairment or loss of the function inherently demonstrated by each component.

In addition, a polymerization inhibitor, in a small enough amount that does not inhibit radical polymerization reactions in the presence of ultraviolet light, is typically added to photo curable ink compositions to impart storage stability to the ink composition. What is more, since radical polymerization is known to be inhibited by oxygen in the air, measures are also deployed in photo curable ink compositions to diminish inhibition of the radical polymerization reaction by oxygen to ensure the obtaining of satisfactory curability. On the other hand, since photo curable ink compositions for ink jet applications spray ink in the form of droplets, the ratio of surface area to volume of the ink increases. Consequently, photo curable ink compositions for ink jet applications have the problem of being easily cured even in air when irradiated with ultraviolet light despite the effects of a small amount of polymerization inhibitor and the inhibitory effects on oxygen in the air.

With the foregoing in view, an object of the present invention is to provide a liquid composition, ink jet recording method, ink jet recording apparatus and printed article that prevent problems caused by unnecessary curing reactions in photo curable ink compositions.

As a result of conducting extensive studies to solve the above-mentioned problems, the inventors of the present invention obtained the finding that the occurrence of such problems can be prevented by using a liquid composition for preventing the curing reaction of a photo curable ink composition by containing an overly excess amount of a radical polymerization inhibitor separate from the photo curable ink composition.

The present invention provides the following inventions based on this finding:

(1) a liquid composition comprising: a radical polymerization inhibitor, a solvent, and a surfactant; wherein, the content of the radical polymerization inhibitor is 0.1 to 50% by weight.

In addition, preferable aspects of the above-mentioned invention include the following:

(2) the liquid composition described in (1) above, wherein the radical polymerization inhibitor is at least one type of compound selected from hydroquinones, catechols, hindered amines, phenols, phenothiazines and quinones of condensed aromatic rings;

(3) the liquid composition described in (1) above, wherein the radical polymerization inhibitor is carbon black or an inorganic/organic fine particle in which a polymerization-preventing functional group is introduced onto the surface thereof;

(4) the liquid composition described in any of (1) to (3) above, wherein the solvent is one or more types of compounds selected from a monoether or diether of ethylene glycol, diethylene glycol, triethylene glycol, tetraethylene glycol, and polyethylene glycol having 10 or more carbon atoms.

(5) the liquid composition described in any of (1) to (4) above, wherein the surfactant is one or more types of compounds selected from polyether-modified silicone-based, polyester-modified silicone-based, and acetylenediol-based surfactants; and, (6) the liquid composition described in any of (1) to (5) above, further containing a lactone.

In addition, the inventors of the present invention also provide the following invention:

(7) an ink set comprising: the liquid composition described in any of (1) to (6) above, and a photo curable ink composition.

In addition, the inventors of the present invention also provide the following invention:

(8) an ink jet recording method comprising: discharging droplets of a photo curable ink composition onto a recording medium; discharging droplets of the liquid composition described in any of (1) to (6) above onto a location other than the location where droplets of the photo curable ink composition are discharged for the purpose of forming an image; and curing the droplets adhered to the recording medium by irradiating ultraviolet light.

Preferable aspects of the above-mentioned invention include the following:

(9) the ink jet recording method described in (8) above, wherein the location other than the location where droplets of the photo curable ink composition are discharged for the purpose of forming an image is at least one location of a cap, wiper, ink absorbent and tube pump of an ink jet recording apparatus;

(10) the ink jet recording method described in (8) and (9) above, wherein the photo curable ink composition further contains an amine compound;

(11) the ink jet recording method described in any of (8) to (10) above, wherein the photo curable ink composition further contains a hyperbranched polymer;

(12) the ink jet recording method described in any of (8) to (11), wherein the photo curable ink composition is of a single liquid curing type; and,

(13) the ink jet recording method described in any of (8) to (11) above, wherein the photo curable ink composition is of a two liquid curing type.

In addition, the inventors of the present invention also provide the following invention:

(14) a recorded article recorded by the ink jet recording method described in any of (8) to (13) above.

In addition, the inventors of the present invention also provide the following invention:

(15) an ink jet recording apparatus, comprising: the liquid composition described in any of (1) to (6) above, a photo curable ink composition, and photoirradiation apparatus for the photo curable ink composition.

Preferable aspects of the above-mentioned invention include the following:

(16) the ink jet recording apparatus described in (15) above, wherein the wavelength of light radiated from the photoirradiation apparatus is within the range of 350 to 450 nm.

According to the liquid composition, ink jet recording method, ink jet recording apparatus and printed article of the present invention, the content of a radical polymerization inhibitor is greater than that of a conventional radical polymerization inhibitor, thereby effectively inhibiting a radical polymerization reaction of a photo curable ink composition. Consequently, even if a photo curable ink composition is adhered at any location (such as a component) of an ink jet recording apparatus, the liquid composition of the present invention inhibits curing thereof, thereby making it possible to prevent problems such as impairment of loss of function of each component of the ink jet recording apparatus accompanying curing of the photo curable ink composition.

DESCRIPTION OF EXEMPLARY EMBODIMENTS

The following provides an explanation of preferable embodiments of the present invention.

Liquid Composition

A liquid composition as claimed in embodiments of the present invention comprises a radical polymerization inhibitor, a solvent and a surfactant, and the content of the radical polymerization inhibitor is 0.1 to 50% by weight.

In the present embodiment, a "radical polymerization inhibitor" refers to that which is used in excess to completely prevent polymerization of a monomer, and is distinguished in terms of the method of use from polymerization inhibitors used in an amount up to a trace amount, such as at a concentration on the order of several ten to several hundred ppm, in photo curable ink composition for the purpose of enhancing storage stability of the photo curable ink composition.

The content of the above-mentioned radical polymerization inhibitor is 0.1 to 50% by weight as described above, and is preferably 10 to 30% by weight from the viewpoints of discharge suitability and efficiency.

In the case the content of the radical polymerization inhibitor is less than 0.1% by weight, the effects of the present invention cannot be obtained since curing of the photo curable ink composition is permitted. On the other hand, if the content of the radical polymerization inhibitor exceeds 50% by weight, there is the potential for the occurrence of problems such as blockage of lines due to precipitation of crystals accompanying changes in temperature, thereby making this undesirable.

Although any radical polymerization inhibitor can be used without incident provided it is a compound having the ability to capture radicals, from the viewpoints of discharge suitability and polymerization preventive effects with respect to the content thereof, namely efficiency, the radical polymerization inhibitor is preferably at least one type of compound selected from hydroquinones, catechols, hindered amines, phenols, phenothiazines and quinones of condensed aromatic rings.

Specific examples of the above-mentioned hydroquinones include hydroquinone, hydroquinone monomethyl ether, 1-o-2,3,5-trimethyl hydroquinone and 2-tert-butyl hydroquinone.

Specific examples of the above-mentioned catechols include catechol, 4-methyl catechol and 4-tert-butyl catechol.

Specific examples of the above-mentioned hindered amines include compounds having a tetramethylpiperidinyl group.

Specific examples of the above-mentioned phenols include phenol, butylhydroxytoluene, butylhydroxyanisole, pyrogallol, gallic acid, gallic acid alkyl esters and hindered phenols.

Specific examples of the above-mentioned phenothiazines include phenothiazine.

Specific examples of the above-mentioned quinones having a condensed aromatic ring include naphthoquinone.

In addition, the radical polymerization inhibitor is preferably in the form of carbon black or an inorganic/organic fine particle in which a polymerization-preventing functional group is introduced onto the surface thereof from the viewpoint polymerization preventive effects obtained with respect to the content thereof, namely efficiency. Specific examples of polymerization-preventing functional groups include a hydroxyphenyl group, dihydroxyphenyl group, tetramethylpiperidinyl group and condensed aromatic ring.

The polymerization inhibitor can also be acquired in the form of a commercial product such as Irgastab UV10 or UV22 manufactured by Chiba Specialty Chemicals Inc.

From the viewpoints of low volatility and low viscosity, the solvent is preferably one or more types of compounds selected from monoethers or diethers of ethylene glycol, diethylene glycol, triethylene glycol, tetraethylene glycol and polyethylene glycol having 10 or more carbon atoms. From the viewpoints of satisfying the above-mentioned conditions as well as discharge characteristics, the solvent is particularly preferably diethylene glycol dimethyl ether, diethylene glycol diethyl ether, triethylene glycol monobutyl ether, triethylene glycol dimethyl ether, tetraethylene glycol monobutyl ether, tetraethylene glycol dimethyl ether, dipropylene glycol monomethyl ether, dipropylene glycol monobutyl ether or dipropylene glycol dimethyl ether.

The amount of the solvent added is preferably 49.9 to 99.9% by weight.

From the viewpoint of improving wettability with respect to printed articles, the surfactant is preferably one or more types of compounds selected from BYK-347, BYK-348, UV3500, UV3510 or UV3570 (BYK Japan KK) and Saffinol E1010 (Nisshin Chemicals Co., Ltd.).

The amount of the surfactant added is preferably 0.01 to 5.0% by weight.

The liquid composition as claimed in the present embodiment preferably further contains a lactone from the viewpoint of improving wettability with respect to apparatus members.

Specific examples of lactones include γ-butyrolactone.

The amount of the lactone added is preferably 1.0 to 30% by weight.

Ink Set

An ink set as claimed in embodiments of the present invention comprises a liquid composition and a photo curable ink composition. Furthermore, the liquid composition described above is used for the liquid composition.

The above-mentioned photo curable ink composition can comprise, for example, a polymerizable compound, a hyperbranched polymer, a polymerization initiator, a polymerization accelerator and a liquid pigment dispersion.

There are no particular limitations on the polymerizable compound (monomer) used in the photo curable ink composition, and various polymerizable compounds can be used, examples of which include N-vinylformamide (abbreviated as NVF), ethylene glycol monoallyl ether (abbreviated as AG), APG-200 (Shin-Nakamura Chemical Co., Ltd.) and Viscoat #360 (Osaka Organic Chemical Industry Ltd.).

The amount of the polymerizable compound added is preferably 50 to 95% by weight.

The hyperbranched polymer used in the photo curable ink composition is preferably a hyperbranched polymer having a dipentaerythritol core and branched functional groups. Here, a "hyperbranched polymer" refers to a dendritic, highly branched polymer composed of a large number of branches. Hyperbranched polymers can be acquired commercially in the form of, for example, Viscoat #1000 or STAR-501 from Osaka Organic Chemical Industry Ltd.

In addition, in the present invention, Viscoat #1000 or STAR-501 manufactured by Osaka Organic Chemical Industry Ltd. is preferably used for the hyperbranched polymer.

Viscoat #1000 and STAR-501 are hyperbranched polymers having a dipentaerythritol core and branched functional groups. Viscoat #1000 is used as a diluent monomer, contains ethylene glycol diacrylate, has a viscosity of 273 mPa·s and has 14 functional groups (acrylic groups). STAR-501 is used as a diluent monomer, contains dipentaerythritol hexaacrylate, has a viscosity of 210 Pa·s and has 20 to 99 functional groups (acrylic groups). Both have acryloyl groups on their outermost surface and can be used preferably.

The amount of the hyperbranched polymer added is preferably 1.0 to 30.0% by weight.

Known photopolymerization initiators described on pages 39 to 56 of the Photopolymer Handbook (Technical Association of Photopolymers, Japan, ed., Kogyo Chosakai Publishing, Inc., 1989), or compounds described in JP-A-64-13142 and JP-A-2-4804, can be arbitrarily used for the polymerization initiator used in the photo curable ink composition.

Polymerization initiators capable of initiating polymerization of a polymerizable compound by generating radicals or ions by absorbing ultraviolet light or visible light in the region of about 200 to 450 nm, for example, are used for the polymerization initiator contained in the photo curable ink composition of the present embodiment.

Typical examples of radical-generating polymerization initiators used in the photo curable ink composition include benzoin methyl ether, benzoin ethyl ether, isopropyl benzoin ether, isobutyl benzoin ether, 1-phenyl-1,2-propanedione-2-(o-ethoxycarbonyl)oxime, benzyl, diethoxyacetophenone, benzophenone, chlorothioxanthone, 2-chlorothioxanthone, isopropylthioxanthone, 2-methylthioxanthone, polychlorinated polyphenyl and hexachlorobenzene, while preferable examples include isobutyl benzoin ether, 1-phenyl-1,2-propanedione-2-(o-ethoxycarbonyl)oxime.

In addition, commercially available polymerization initiators can also be used, examples of which include Vicure 10 and 30 (Stauffer Chemical), Irgacure 184, 127, 500, 651, 2959, 907, 369, 379, 754, 1700, 1800, 1850, 1870, 819 and 4265, OXE01, Darocur 1173, TPO and ITX (Chiba Specialty Chemicals Inc.), Quantacure CTX, ITX (Aceto Chemical Co., Inc.), Kayacure DETX-S (Nippon Kayaku Co., Ltd.), Esacure KIP150 (Lamberti) and Lucirin TPO (BASF).

The amount of the polymerization initiator added is preferably 0.5 to 15% by weight.

Examples of polymerization accelerators used in the photo curable ink composition include polymerization accelerators composed of amine compounds. Although there are no particular limitations on these amine compounds, in order to ensure the absence of problems with odor and reliable curing of the ink composition, aminobenzoate derivatives are preferable. This is because aminobenzoate derivatives reduce inhibition of polymerization by oxygen.

Aminobenzoate derivatives not having absorbance in the wavelength band of 350 nm or more are preferable. There are no particular limitations on these aminobenzoate derivatives, and examples include ethyl-4-dimethylaminobenzoate and 2-ethylhexyl-4-dimethylaminobenzoate. These can also be acquired commercially under the product names of Darocur EDB and Darocur EHA (Chiba Specialty Chemicals Inc.).

The amount of the polymerization accelerator added is preferably 0.01 to 5.0% by weight.

In addition, a sensitizer may also be added for the purpose of efficiently using irradiated light in the polymerization reaction. Examples of sensitizers include dye derivatives such as coumarin-based, cyanine-based and anthracene-based dye derivatives.

A liquid pigment dispersion used in the photo curable ink composition can at least contain a colorant, dispersant, polymerizable compound and polymerization inhibitor.

A pigment is preferably used for the colorant used in the liquid pigment dispersion from the viewpoint of lightfastness. An inorganic or organic pigment can be used.

Examples of inorganic pigments that can be used include carbon black (C.I. pigment black 7) such as furnace black, lamp black, acetylene black or channel black, iron oxide, titanium dioxide, alumina and calcium carbonate.

Examples of organic pigments include azo pigments such as insoluble azo pigment, condensed azo pigment, azo lake and chelated azo pigment, polycyclic pigments such as phthalocyanine pigment, perylene and perylyne pigments, anthraquinone pigment, quinacridone pigment, dioxane pigment, thioindigo pigment, isoindigo pigment and quinophthalone pigment, dye chelates (such as basic dye chelates and acidic dye chelates), dye lakes (such as basic dye lakes and acidic dye lakes), nitro pigments, nitroso pigments, aniline black and daylight fluorescent pigment. These pigments can be used alone or two or more types can be used in combination. In addition, pigments not listed in the color index can also be used provided they are insoluble in the ink composition.

Carbon black is preferable as a black pigment. Specific examples of carbon black include #2300, #900, HCF88, #33, #40, #45, #52, MA7, MA8, MA100 and #2200B manufactured by Mitsubishi Chemical Corp., Raven 5750, Raven 5250, Raven 5000, Raven 3500, Raven 1255 and Raven 700 manufactured by Colombia Carbon Corp., Regal 400R, Regal 330R, Regal 660R, Mogul L, Mogul 700, Monarch 800, Monarch 880, Monarch 900, Monarch 1000, Monarch 1100, Monarch 1300 and Monarch 1400 manufactured by Cabot Corp., and Color Black FW1, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A and Special Black 4 manufactured by Degussa AG, and these can be used alone or two or more types may be used as a mixture.

Examples of yellow pigments include C.I. pigment yellow 1, 2, 3, 12, 13, 14, 16, 17, 73, 74, 75, 83, 93, 95, 97, 98, 109, 110, 114, 120, 128, 129, 138, 150, 151, 154, 155, 180, 185 and 213, while preferable examples include one type or a mixture of two or more types selected from the group consisting of C.I. pigment yellow 74, 109, 110, 128, 138 and 213.

Examples of magenta and light magenta pigments include C.I. pigment red 5, 7, 12, 48(Ca), 48(Mn), 57(Ca), 15:1, 112, 122, 123, 168, 184, 202 and 209, and C.I. pigment violet 19, while preferable examples include one type or a mixture of two or more types selected from the group consisting of C.I. pigment red 122, 202 and 209 and C.I. pigment violet 19.

Examples of cyan and light cyan pigments include C.I. pigment blue 1, 2, 3, 15:3, 15:4, 15:34, 16, 22 and 60, and C.I. vat blue 4 and 60, while preferable examples include one type or a mixture of two or more types selected from the group consisting of C.I. pigment blue 15:3, 15:4 and 60.

Examples of pigments used in white ink include titanium dioxide, calcium carbonate, calcium sulfate, zinc oxide, barium sulfate, barium carbonate, silica, alumina, kaolin, clay, talc, white clay, aluminum hydroxide, magnesium carbonate and white hollow resin emulsions, while preferable examples include one type or a mixture of two or more types selected from the group consisting of these pigments.

In addition, each color of pigment can be mutually mixed to adjust the color tone thereof. For example, pigment black 7 and pigment blue 15:3 can be mixed for the purpose of changing the color tone of a reddish black to a bluish black.

The mean particle diameter of pigment used in the present embodiment is preferably within the range of 10 to 500 nm and more preferably within the range of 50 to 300 nm. In addition, although the blended amount of pigment used in the present embodiment may be suitably determined according to the type of ink composition such as a light and dark ink composition, it is normally 1.5 to 20% by weight and preferably 3 to 10% by weight in the ink composition.

A polyoxyalkylene polyalkylene polyamine represented by $(C_2H_4N)_n$—$(PO)_x$-$(EO)_y$—OH (wherein, n, x and y respectively refer to integers of 1 or more, PO refers to propylene oxide, and EO refers to ethylene oxide) can be used as a dispersant used in the liquid pigment dispersion. Specific examples of polyoxyalkylene polyalkylene polyamines include Discole N-503, N-506, N-509, N-512, N-515, N-518 and N-520.

The amount of the dispersant added is preferably 0.1 to 20% by weight and more preferably 0.5 to 10% by weight.

There are no particular limitations on the radical polymerizable compound used in the liquid pigment dispersion provided it is ordinarily used in photocurable inks, preferable examples include allyl compounds, while more preferable examples include allyl ether compounds, ethylene glycol monoallyl ether, trimethylolpropane diallyl ether, trimethylolpropane monoallyl ether, glycerin monoallyl ether, allyl glycidyl ether and pentaerythritol triallyl ether, with particularly preferable examples including ethylene glycol monoallyl ether, trimethylolpropane dially ether and/or N-vinyl compounds, and particularly preferably N-vinyl formamide.

Ethylene glycol monoally ether and/or N-vinyl formamide are monofunctional radical polymerizable monomers that have a low tendency to undergo undesirable polymerization due to dark reactions during storage, thereby making them preferable for use.

In particular, allyl ether compounds such as ethylene glycol monoallyl ether (trade name: Allyl Glycol) and trimethylolpropane diallyl ether have the characteristic of not being polymerized by themselves even if carbon radicals are present that have been generated by decomposition of a photoradical polymerization initiator.

There are no particular limitations on polymerizable compounds other than this N-vinyl formamide and ethylene glycol monoallyl ether provided they are polymerized by radicals or ions generated from a photopolymerization initiator. Such polymerizable compounds are referred to as molecules capable of serving as structural units of the basic structure of polymers. These polymerizable compounds are also referred to as polymerizable monomers, and include monofunctional monomers, bifunctional monomers and multifunctional monomers. Furthermore, there are no particular limitations on these monofunctional monomers, bifunctional monomers and polyfunctional monomers, and those having a molecular weight of about 100 to 3000 (and preferably about 100 to 2000) can be used.

Typical examples of these polymerizable compounds in the form of monofunctional monomers include phenoxyethyl acrylate, isobornyl acrylate, methoxydiethylene glycol monoacrylate, acroloyl morpholine, lauryl methacrylate, 2-hydroxyethyl methacrylate, cyclohexyl methacrylate and oxetane methacrylate.

Examples of bifunctional monomers include ethylene glycol dimethacrylate, diethylene glycol diacrylate, diethylene glycol dimethacrylate, tripropylene glycol diacrylate, 1,9-nonanediol diacrylate, polyethylene glycol #400 diacrylate, tetraethylene glycol dimethacrylate, 1,6-hexanediol diacrylate, 1,6-hexanediol dimethacrylate, neopentyl glycol diacrylate, neopentyl glycol dimethacrylate, 2-hydroxy-1,3-dimethacryloxypropane, hydroxybioperine acid ester neopentyl glycol diacrylate and 1,4-butanediol dimethacrylate.

Examples of polyfunctional monomers include trimethylolpropane triacrylate, trimethylolpropane trimethacrylate, trimethylolpropane EO adduct triacrylate, trimethylolpropane PO adduct triacrylate, glycerin EO adduct triacrylate, glycerin PO adduct triacrylate, pentaerythritol triacrylate, dipentaerythritol hexaacrylate, dipentaerythritol polyacrylate and dendrimers produced using reactions between polyfunctional monomers.

The amount of the polymerizable compound added is preferably 5 to 95% by weight.

Examples of the radical polymerization inhibitor used in the liquid pigment dispersion include phenol-based antioxidants, hindered amine photostabilizers, phosphorous-based antioxidants and hydroquinone monomethyl ether widely used in (meth)acrylic monomers as well as hydroquinone, t-butylcatechol and pyrogallol.

The amount of the radical polymerization inhibitor added is preferably 0.001 to 0.5% by weight.

The photo curable ink composition of the present embodiment may also contain an aqueous solvent. Moreover, a resin emulsion, inorganic oxide colloid, lubricant, pH adjuster, antiseptic, antimold agent or surfactant and the like may also be added as optional components.

In addition, the photo curable ink composition may be of the one-liquid curing type or two-liquid curing type.

Recording Method

Although the liquid composition and photo curable ink composition described above can be preferably used in a pen or other writing instrument, a stamp and the like, they can be used more preferably in an ink jet recording method by which recording is carried out by discharging droplets of a photo curable ink composition and adhering the droplets onto a recording medium. Here, an "ink jet recording method" refers to a method for discharging an ink composition from fine nozzles in the form of droplets and adhering those droplets onto a recording medium. A specific example of this recording method is explained below.

The ink jet recording method as claimed in the present embodiment is comprised of a step for discharging droplets of a photo curable ink composition onto a recording medium, a step for discharging droplets of the above-mentioned liquid composition at locations other than locations where droplets of the photo curable ink composition are discharged for the purpose of forming an image, and a step for curing the droplets adhered to the recording medium.

Here, examples of "locations other than locations where droplets of the photo curable ink composition are discharged for the purpose of forming an image" include at least one location consisting of a cap, wiper, ink absorbent and tube pump of an ink jet recording apparatus. A photo curable ink composition is cured by a polymerization reaction when irradiated with ultraviolet light. Consequently, if a location where the photo curable ink composition is adhered, such as a cap, wiper, ink absorbent or tube pump of an ink jet recording apparatus is exposed to ultraviolet light, the photo curable ink composition ends up being cured at that location. As a result, the functions of these components may be impaired or lost due to the presence of this cured ink (resinated cured product).

In contrast, if the above-mentioned liquid composition is discharged onto the cap, wiper, ink absorbent or tube pump and so on of an ink jet recording apparatus, the radical polymerization inhibitor contained in the liquid composition prevents the curing reaction of the photo curable ink composition. Consequently, even if the photo curable ink composition becomes adhered to the cap, wiper, ink absorbent, tube pump and so on and those components are irradiated with ultraviolet light, the ink (resin) is not cured. As a result, problems do not occur in the ink jet recording apparatus and the performance thereof can be maintained over a long period of time.

The step for discharging droplets of the liquid composition at locations other than locations where droplets of the photo curable ink composition are discharged for the purpose of forming an image can be carried out by a method such as discharging the liquid composition during cleaning or maintenance work.

It is necessary that the timing by which the liquid composition is discharged be such that the liquid composition is discharged before the photo curable ink composition is cured. Since the liquid composition used in the present embodiment is only intended to inhibit the radical polymerization reaction of the photo curable ink composition, it is unable to dissolve resin once it has been cured.

The amount of the liquid composition discharged is preferably 0.1 to 10 based on a value of 1 for the amount of photo curable ink composition discharged.

The following provides an explanation of examples of methods for discharging the photo curable ink composition.

A first method employs electrostatic suction whereby a strong electric field is applied between a nozzle and accelerating electrodes placed in front of the nozzle, ink is continuously sprayed from the nozzle in the form of droplets, and a printing information signal is applied to deflecting electrodes during the time ink droplets are projected between the deflecting electrodes, or ink droplets are sprayed corresponding to a printing information signal without being deflected.

A second method consists of applying pressure to ink droplets with a small pump, and forcibly spraying the ink droplets by mechanically vibrating a nozzle with a crystal unit and the like. The sprayed ink droplets are charged simultaneous to spraying, and a printing information signal is applied to deflecting electrodes during the time the ink droplets are projected between the deflecting electrodes.

A third method uses a piezoelectric device to spray and record ink droplets by simultaneously applying pressure and a printing information signal to an ink with the piezoelectric device.

A fourth method consists of rapidly causing volumetric expansion of an ink using the action of heat energy to spray and record ink droplets by heating and foaming the ink droplets with microelectrodes in accordance with a printing information signal.

Each of the above-mentioned methods can be used for the ink jet recording method of the present embodiment, and can be applied to each type of ink jet cartridge.

After discharging droplets of the above-mentioned liquid composition, ink droplets adhered to a recording medium are cured by irradiating ultraviolet light in accordance with ordinary methods.

There are no particular limitations on the recording medium, and various recording media can be used, examples of which include ordinary paper, dedicated ink jet paper (matte paper, gloss paper), glass, plastic, films, metal and printed wiring boards.

The conditions used for irradiation with ultraviolet light are preferably suitably selected according to the amount and thickness of the ink composition adhered on the substrate or recording medium. Consequently, although unable to be strictly specified, the wavelength of light radiated from a light source is, for example, preferably within the range of 350 to 450 nm.

In addition, the dose of radiated ultraviolet light is within the range of 10 to 10,000 mJ/cm², and preferably within the range of 50 to 6,000 mJ/cm². If ultraviolet light is radiated within this range, the curing reaction of the photo curable ink composition can be carried out adequately.

Examples of ultraviolet irradiation include ultraviolet radiation radiated from a lamp such as a metal halide lamp, xenon lamp, carbon arc lamp, chemical lamp, low-pressure mercury lamp or high-pressure mercury lamp. Ultraviolet light can also be radiated using a commercially available lamp such as the H Lamp, D Lamp or V Lamp manufactured by Fusion Systems Inc.

In addition, ultraviolet light is particularly preferably radiated from an ultraviolet light-emitting semiconductor device such as an ultraviolet light-emitting diode (UV LED) or ultraviolet light-emitting semiconductor laser in terms of reducing energy consumption.

In addition, in the ink jet recording method of the present embodiment, heating may be carried out before, simultaneous to or after irradiation with ultraviolet light. Examples of heating methods include heating by contacting a heat source with the recording medium, and heating methods in which a heat source is not contacted with the recording medium, such as by irradiating infrared light or microwaves (electromagnetic waves having a maximum wavelength of about 2,450 MHz) or blowing hot air onto the recording medium.

Recorded Article

A recorded article of the present embodiment is that which undergoes recording by the above-mentioned ink jet recording method using the liquid composition and photo curable ink composition described above. Since this recorded article is obtained by the above-mentioned ink jet recording method using the liquid composition and photo curable ink composition described above, it has favorable printing quality, demonstrates superior printing stability, exhibits an attractively colored state, and is able to maintain that attractively colored state over a long period of time.

EXAMPLES

Preparation of Radical Polymerization-Preventing Liquid Composition

Polymerization-preventing liquid compositions as claimed in Examples 1 to 8 and Comparative Examples 1 to 5 were prepared according to the compositions shown below. Namely, solvent, surfactant and radical polymerization inhibitor were mixed and completely dissolved followed by filtering with a 5 μm membrane filter to prepare radical polymerization-preventing compositions.

Example 1

Radical Polymerization-Preventing Liquid Composition 1
Radical Polymerization-Preventing Liquid Composition 1

| | |
|---|---|
| Diethylene glycol diethyl ether | 59.5 wt % |
| γ-Butyrolactone | 15 wt % |
| Tetraethylene glycol dimethyl ether | 15 wt % |
| Hydroquinone monomethyl ether | 10 wt % |
| BYK-UV3500 (polyether-modified silicone-based surfactant) | 0.5 wt % |

Example 2

Radical Polymerization-Preventing Liquid Composition 2

| | |
|---|---|
| Diethylene glycol diethyl ether | 39.5 wt % |
| γ-Butyrolactone | 15 wt % |
| Tetraethylene glycol dimethyl ether | 15 wt % |
| Hydroquinone monomethyl ether | 30 wt % |
| BYK-UV3500 | 0.5 wt % |

Example 3

Radical Polymerization-Preventing Liquid Composition 3

| | |
|---|---|
| Diethylene glycol diethyl ether | 66.5 wt % |
| γ-Butyrolactone | 15 wt % |
| Tetraethylene glycol dimethyl ether | 15 wt % |
| Irgastab UV-10 | 3 wt % |
| BYK-UV3500 | 0.5 wt % |

Example 4

Radical Polymerization-Preventing Liquid Composition 4

| | |
|---|---|
| Diethylene glycol diethyl ether | 59.5 wt % |
| Triethylene glycol monobutyl ether | 30 wt % |
| Hydroquinone monomethyl ether | 10 wt % |
| BYK-UV3500 | 0.5 wt % |

Example 5

Radical Polymerization-Preventing Liquid Composition 5

| | |
|---|---|
| Diethylene glycol diethyl ether | 64.5 wt % |
| Dipropylene glycol monomethyl ether | 25 wt % |
| Hydroquinone monomethyl ether | 10 wt % |
| BYK-UV3500 | 0.5 wt % |

Example 6

Radical Polymerization-Preventing Liquid Composition 6

| | |
|---|---|
| Diethylene glycol diethyl ether | 64.5 wt % |
| Dipropylene glycol monomethyl ether | 25 wt % |
| 4-tert-butyl catechol | 10 wt % |
| BYK-UV3500 | 0.5 wt % |

Example 7

Radical Polymerization-Preventing Liquid Composition 7

| | |
|---|---|
| Diethylene glycol diethyl ether | 59.8 wt % |
| γ-Butyrolactone | 15 wt % |
| Tetraethylene glycol dimethyl ether | 15 wt % |
| Hydroquinone monomethyl ether | 10 wt % |
| BYK-UV3570 (Polyester-modified silicone-based surfactant) | 0.2 wt % |

Example 8

Radical Polymerization-Preventing Liquid Composition 8

| | |
|---|---|
| Diethylene glycol diethyl ether | 59.0 wt % |
| γ-Butyrolactone | 15 wt % |
| Tetraethylene glycol dimethyl ether | 15 wt % |
| Hydroquinone monomethyl ether | 10 wt % |
| Saffinol E1010 (acetylenediol-based surfactant) | 1.0 wt % |

Comparative Example 1

Radical Polymerization-Preventing Liquid Composition 9

| | |
|---|---|
| Diethylene glycol diethyl ether | 69.5 wt % |
| γ-Butyrolactone | 15 wt % |
| Tetraethylene glycol dimethyl ether | 15 wt % |
| BYK-UV3500 | 0.5 wt % |

Comparative Example 2

Radical Polymerization-Preventing Liquid Composition 10

| | |
|---|---|
| Diethylene glycol diethyl ether | 69.45 wt % |
| γ-Butyrolactone | 15 wt % |
| Tetraethylene glycol dimethyl ether | 15 wt % |
| Hydroquinone monomethyl ether | 0.05 wt % |
| BYK-UV3500 | 0.5 wt % |

Comparative Example 3

Radical Polymerization-Preventing Liquid Composition 11

| | |
|---|---|
| Diethylene glycol diethyl ether | 18.5 wt % |
| γ-Butyrolactone | 15 wt % |
| Tetraethylene glycol dimethyl ether | 15 wt % |
| Hydroquinone monomethyl ether | 51 wt % |
| BYK-UV3500 | 0.5 wt % |

Comparative Example 4

Radical Polymerization-Preventing Liquid Composition 12

| | |
|---|---|
| Diethylene glycol diethyl ether | 56.5 wt % |
| γ-Butyrolactone | 15 wt % |
| Tetraethylene glycol dimethyl ether | 15 wt % |
| Hydroquinone monomethyl ether | 10 wt % |
| BYK-UV3500 | 0.5 wt % |
| Ion exchange water | 3 wt % |

Comparative Example 5

Radical Polymerization-Preventing Liquid Composition 13

| | |
|---|---|
| Diethylene glycol diethyl ether | 70.0 wt % |
| γ-Butyrolactone | 15 wt % |
| Tetraethylene glycol dimethyl ether | 15 wt % |

TABLE 1

| | | Ex. 1 | Ex. 2 | Ex. 3 | Ex. 4 | Ex. 5 | Ex. 6 | Ex. 7 | Ex. 8 | Comp. Ex. 1 | Comp. Ex. 2 | Comp. Ex. 3 | Comp. Ex. 4 | Comp. Ex. 5 |
|---|---|---|---|---|---|---|---|---|---|---|---|---|---|---|
| Solvent | Diethylene glycol diethyl ether | 59.5 | 39.5 | 66.5 | 59.5 | 64.5 | 64.5 | 59.8 | 59.0 | 69.5 | 69.45 | 18.5 | 56.5 | 70.0 |
| | γ-Butyrolactone | 15 | 15 | 15 | | | | 15 | 15 | 15 | 15 | 15 | 15 | 15 |
| | Tetraethylene glycol dimethyl ether | 15 | 15 | 15 | | | | 15 | 15 | 15 | 15 | 15 | 15 | 15 |
| | Triethylene glycol monobutyl ether | | | | 30 | | | | | | | | | |
| | Dipropylene glycol monomethyl ether | | | | | 25 | 25 | | | | | | | |
| Polymerization inhibitor | Hydroquinone monomethyl ether | 10 | 30 | | 10 | 10 | | 10 | 10 | | 0.05 | 51 | 10 | |

TABLE 1-continued

|  |  | Ex. 1 | Ex. 2 | Ex. 3 | Ex. 4 | Ex. 5 | Ex. 6 | Ex. 7 | Ex. 8 | Comp. Ex. 1 | Comp. Ex. 2 | Comp. Ex. 3 | Comp. Ex. 4 | Comp. Ex. 5 |
|---|---|---|---|---|---|---|---|---|---|---|---|---|---|---|
| Polymerization inhibitor | Irgastab UV-10 |  |  | 3 |  |  |  |  |  |  |  |  |  |  |
| Polymerization inhibitor | 4-tert-butyl catechol |  |  |  |  |  | 10 |  |  |  |  |  |  |  |
| Surfactant | BYK-UV3500 | 0.5 | 0.5 | 0.5 | 0.5 | 0.5 | 0.5 | 0.2 |  | 0.5 | 0.5 | 0.5 | 0.5 |  |
| Surfactant | Saffinol E1010 |  |  |  |  |  |  |  | 1.0 |  |  |  |  |  |
| Solvent | Ion exchange water |  |  |  |  |  |  |  |  |  |  |  | 3 |  |

Preparation of Liquid Pigment Dispersions

A liquid pigment dispersion was prepared according to the method described below. A monomer in the form of ethylene glycol monoallyl ether (Nippon Nyukazai Co., Ltd., to be referred to as "AG") was added to 15 parts of a colorant in the form of C.I. pigment black 7 (carbon black: C.I. PBk7) and 6.0 parts of a dispersant in the form of Discole N-509 (Dainichi Seika Color & Chemicals Mfg. Co., Ltd.) and brought to a total of 100 parts followed by mixing and stirring to obtain a mixture. This mixture was subjected to dispersion treatment for 6 hours with zirconia beads (diameter: 1.5 mm) using a sand mill (Yasukawa Seisakusho Co., Ltd.). The zirconia beads were subsequently separated with a separator to obtain a black liquid pigment dispersion 1.

Liquid pigment dispersions were then similarly prepared corresponding to each color, and the resulting liquid pigment dispersions consisted of a yellow liquid pigment dispersion 2 (C.I. pigment yellow 151: C.I. PY151), magenta liquid pigment dispersion 3 (C.I. pigment violet 19: C.I. PV19), cyan liquid pigment dispersion 4 (C.I. pigment blue 15:3: C.I. PB15:3), and white liquid pigment dispersion 5 (C.I. pigment white 6: C.I. PW6). The types of pigments and added amounts (wt %) are shown in Table 2 along with the amounts of dispersant added (wt %).

Preparation Photo Curable Ink Set 1

Monomer, hyperbranched polymer, photopolymerization initiator, polymerization accelerator and liquid pigment dispersion were added according to the composition shown in Table 2 (wt %) to prepare a two-liquid type, photocurable color ink set.

Photo curable ink compositions A1 and B1 to B5 were prepared according to the compositions shown in Table 2. Namely, the monomer, photopolymerization initiator, polymerization accelerator, surfactant and polymerization inhibitor were mixed and completely dissolved to prepare ink composition A1. Next, the monomer, polymerization accelerator, surfactant and polymerization inhibitor were similarly mixed and completely dissolved followed by gradually dropping in the above-mentioned liquid pigment dispersion 1 into the ink solvent of ink composition B1 while stirring. Following completion of dropping, the mixture was mixed and stirred for 1 hour at room temperature to obtain ink composition B1. Subsequently, ink compositions A1 and B1 were each filtered with a 5 μm membrane filter to obtain the desired photo curable ink compositions A1 and B1.

In addition, each of the above-mentioned liquid pigment dispersions 2 to 5 was added according to the same method as photo curable ink composition B1 to prepare photo curable ink compositions B2 to B5.

In Table 2, "NVF" refers to N-vinylformamide manufactured by Arakawa Chemical Industries, Ltd., "AG" refers to ethylene glycol monoallyl ether manufactured by Nippon Nyukazai Co., Ltd., "Viscoat #1000 (abbreviated as V#1000)" and "STAR-501" refer to hyperbranched polymers manufactured by Osaka Organic Chemical Industry Ltd., "Irgacure 819", "Irgacure 369" and "Irgacure 127" refer to polymerization initiators manufactured by Ciba Specialty Chemicals Inc., "Darocur EDB" refers to a polymerization accelerator manufactured by Ciba Specialty Chemicals Inc., "BYK-UV3570" refers to a silicone-based surfactant manufactured by BYK Japan KK, "Kayacure DETX-S" refers to a polymerization initiator manufactured by Nippon Kayaku Co., Ltd., and "Irgastab UV10" refers to a polymerization inhibitor manufactured by Ciba Specialty Chemicals Inc. Furthermore, units are percent by weight (wt %).

TABLE 2

Photo curable Ink Set 1

| | Ink Composition | | | | | |
|---|---|---|---|---|---|---|
| | A1 | B1 | B2 | B3 | B4 | B5 |
| NVF | — | 25.0 | — | — | — | — |
| AG | 72.7 | 51.7 | 76.7 | 76.7 | 76.7 | 76.7 |
| STAR-501 | 17.0 | 13.0 | 13.0 | 13.0 | 13.0 | 13.0 |
| Irgacure 819 | 6.4 | — | — | — | — | — |
| Irgacure 127 | 1.6 | — | — | — | — | — |
| Darocur EDB | 1.0 | 1.0 | 1.0 | 1.0 | 1.0 | 1.0 |
| BYK-UV3570 | 0.1 | 0.1 | 0.1 | 0.1 | 0.1 | 0.1 |
| Kayacure DETX-S | 1.0 | 1.0 | 1.0 | 1.0 | 1.0 | 1.0 |
| Irgastab UV10 | 0.2 | 0.2 | 0.2 | 0.2 | 0.2 | 0.2 |
| Pigment | — | C.I.PBk7 | C.I.PY151 | C.I.PV19 | C.I.PB15: 3 | C.I.PW6 |
| (Solid content) | — | 6.0 | 6.0 | 6.0 | 6.0 | 6.0 |
| Dispersant | — | 2.0 | 2.0 | 2.0 | 2.0 | 2.0 |

Reliability Test 1

Full-color images were printed using each of the ink compositions shown in Table 2 and the PM-G920 ink jet printer manufactured by Seiko Epson Corp. At this time, ink composition B1 was filled into the photo black column, ink compositions B2 to B4 were filled into their corresponding color columns, ink composition A1 was filled into the gloss optimizer column, and ink composition B5 was filled into the matte black column.

In addition, radical polymerization-preventing liquid composition A1 was filled into the red and blue columns and full-color images were printed under printing conditions such that each of the colored ink droplets covered their corresponding locations while ink composition A1 covered the entire image area at normal temperature and normal pressure.

The radical polymerization-preventing liquid composition was discharged onto the cap, wiper and ink absorbent of the ink jet printer during printer operation and regularly scheduled maintenance. The mixture of ink composition and radical polymerization-preventing ink composition that had accumulated in the cap as a result of printing, regularly scheduled maintenance, regularly scheduled flushing and cleaning operations was suitably removed by aspirating with a waste liquid pump and discharged as waste liquid.

An A4-size OHP film (Fuji Xerox, Xerox Film, no borders) was used for the recording medium. Continuous, borderless printing and curing treatment were carried out for 6 hours under curing conditions such that the total irradiated dose of ultraviolet light was 600 mJ/cm$^2$ using an ultraviolet LED, in which the quantity of light from the ultraviolet light source had wavelength peaks at 365 nm, 380 nm and 395 nm, installed in the vicinity of the printer head. The operations of the cap, wiper, ink absorbent and tube pump were then tested for the checked parameters indicated below.

Checked Parameters:

Cap: Presence of defective suction caused by defective adhesion

Wiper: Presence of defective cleaning caused by adherence of cured substance

Ink absorbent: Presence of soiling of recorded articles due to defective absorption caused by curing on ink absorbent Tube pump: Presence of defective suction caused by blockage by cured ink The checked parameters were then evaluated based on the following evaluation indices.

Evaluation Indices:

A: No particular problems observed

B: Problems with any of the above-mentioned mechanisms due to increased viscosity and gelling of photocurable ink composition C: Problems with any of the above-mentioned mechanisms due to curing and crystallization of photocurable ink composition Those results are shown in Table 3.

TABLE 3

| | Photo curable ink set | Radical polymerization-preventing liquid composition | Cap | Wiper | Ink absorbent | Waste liquid pump |
|---|---|---|---|---|---|---|
| Example 1 | 1 | 1 | A | A | A | A |
| Example 2 | 1 | 2 | A | A | A | A |
| Example 3 | 1 | 3 | A | A | A | A |
| Example 4 | 1 | 4 | A | A | A | A |
| Example 5 | 1 | 5 | A | A | A | A |
| Example 6 | 1 | 6 | A | A | A | A |
| Example 7 | 1 | 7 | A | A | A | A |
| Example 8 | 1 | 8 | A | A | A | A |
| Comp. Ex. 1 | 1 | 9 | C | B | C | B |
| Comp. Ex. 2 | 1 | 10 | B | B | C | B |
| Comp. Ex. 3 | 1 | 11 | C | C | C | C |
| Comp. Ex. 4 | 1 | 12 | C | B | C | C |
| Comp. Ex. 5 | 1 | 13 | C | C | C | B |

As shown in Table 3, printing using the liquid compositions of Examples 1 to 8 made it possible to maintain printer performance without causing problems in any of the components of the cap, wiper, ink absorbent or waste liquid pump of the ink jet printer. A detailed description of this is provided below.

In the cap, solidification caused by curing during head capping was also able to be prevented on the ink absorbent (sponge and the like) housed in the head cap by discharging and aspirating the liquid composition.

In the wiper, it was also possible to discharge the liquid composition directly, and since the mixture of photo curable ink composition and liquid composition adhered to the nozzle plate did not harden as a result of polymerization, it was able to be completely removed by wiping during the cleaning operation. Moreover, since the mixture of photo curable ink composition and liquid composition adhered to the wiper was also not cured, wiper deterioration was able to be prevented.

In the ink absorbent, since the liquid composition is also discharged when discharging onto the ink absorbent (flushing) during printing for the purpose of preventing nozzle clogging, there was no hardening of the ink absorbent (sponge and the like) caused by curing.

In the waste liquid pump, clogging, caused by curing of ink remaining inside the tube following aspiration of ink that had been discharged into the cap, was able to be prevented.

Preparation of Photo Curable Ink Set 2

The above-mentioned liquid pigment dispersions 1 to 5 were respectively added to the above-mentioned photo curable ink composition B1 using the same method to prepare photo curable ink composition A2 and B6 to B10 according to the compositions shown in Table 4.

TABLE 4

Photo curable Ink Set 2

| Ink Composition | A2 | B6 | B7 | B8 | B9 | B10 |
|---|---|---|---|---|---|---|
| NVF | — | 25.0 | — | — | — | — |
| AG | 66.7 | 46.7 | 66.7 | 66.7 | 66.7 | 66.7 |
| V#1000 | 25.0 | 20.0 | 25.0 | 25.0 | 25.0 | 25.0 |
| Irgacure 819 | 6.4 | — | — | — | — | — |
| Irgacure 127 | 1.6 | — | — | — | — | — |
| BYK-UV3570 | 0.1 | 0.1 | 0.1 | 0.1 | 0.1 | 0.1 |
| Irgastab UV10 | 0.2 | 0.2 | 0.2 | 0.2 | 0.2 | 0.2 |
| Pigment | — | C.I.PBk7 | C.I.PY151 | C.I.PV19 | C.I.PB15:3 | C.I.PW6 |
| (Solid content) | — | 6.0 | 6.0 | 6.0 | 6.0 | 6.0 |
| Dispersant | — | 2.0 | 2.0 | 2.0 | 2.0 | 2.0 |

Reliability Test 2

Full-color images were printed using each of the ink compositions shown in Table 4 and the PM-G920 ink jet printer manufactured by Seiko Epson Corp. At this time, ink composition B6 was filled into the photo black column, ink compositions B7 to B9 were filled into their corresponding color columns, ink composition A2 was filled into the gloss optimizer column, and ink composition B10 was filled into the matte black column.

In addition, the corresponding radical polymerization-preventing liquid compositions were filled into the red and blue columns and full-color images were printed under printing conditions such that each of the colored ink droplets covered their corresponding locations while ink composition A2 covered the entire image area at normal temperature and normal pressure. Other conditions were the same as those in Reliability Test 1.

Those results are shown in Table 5.

TABLE 5

| | Photo curable ink set | Radical polymerization-preventing liquid composition | Cap | Wiper | Ink absorbent | Waste liquid pump |
|---|---|---|---|---|---|---|
| Example 9 | 2 | 1 | A | A | A | A |
| Example 10 | 2 | 3 | A | A | A | A |
| Example 11 | 2 | 6 | A | A | A | A |
| Comp. Ex. 6 | 1 | — | C | C | C | C |
| Comp. Ex. 7 | 2 | — | C | C | C | C |
| Comp. Ex. 8 | 2 | 9 | C | B | C | B |
| Comp. Ex. 9 | 2 | 13 | C | C | C | B |

Preparation of Photo Curable Ink Set 3

The above-mentioned liquid pigment dispersions 1 to 5 were respectively added to the above-mentioned photo curable ink composition B1 using the same method to prepare photo curable ink composition B11 to B15 according to the compositions shown in Table 6. At that time, C.I. PY213 was used instead of C.I. PY151 in liquid pigment dispersion 2.

TABLE 6

Photo curable Ink Set 3

| Ink Composition | B11 | B12 | B13 | B14 | B15 |
|---|---|---|---|---|---|
| AG | 67.7 | 67.7 | 67.7 | 67.7 | 67.7 |
| V#1000 | 20.0 | 20.0 | 20.0 | 20.0 | 20.0 |
| Irgacure 819 | 3.2 | 3.2 | 3.2 | 3.2 | 3.2 |
| Irgacure 369 | 0.8 | — | — | — | — |
| Irgacure 127 | — | 0.8 | 0.8 | 0.8 | 0.8 |
| BYK-UV3500 | 0.1 | 0.1 | 0.1 | 0.1 | 0.1 |
| Irgastab UV10 | 0.2 | 0.2 | 0.2 | 0.2 | 0.2 |
| Pigment | C.I.PBk7 | C.I.PY213 | C.I.PV19 | C.I.PB15:3 | C.I.PW6 |
| (Solid content) | 6.0 | 6.0 | 6.0 | 6.0 | 6.0 |
| Dispersant | 2.0 | 2.0 | 2.0 | 2.0 | 2.0 |

Reliability Test 3

Full-color images were printed using each of the ink compositions shown in Table 6 and the PM-G920 ink jet printer manufactured by Seiko Epson Corp. At this time, ink composition B11 was filled into the photo black column, ink compositions B12 to B14 were filled into their corresponding color columns, and ink composition B15 was filled into the matte black column. Full-color images were printed at the corresponding locations of each of the colored ink droplets at normal temperature and normal pressure. Other conditions were the same as those in Reliability Test 1.

Those results are shown in Table 7.

TABLE 7

| | Photo curable inkset | Radical polymerization-preventing liquid composition | Cap | Wiper | Ink absorbent | Waste liquid pump |
|---|---|---|---|---|---|---|
| Example 9 | 3 | 1 | A | A | A | A |
| Example 10 | 3 | 3 | A | A | A | A |
| Example 11 | 3 | 6 | A | A | A | A |
| Comp. Ex. 6 | 3 | — | C | C | C | C |
| Comp. Ex. 8 | 3 | 9 | C | B | C | B |

TABLE 7-continued

| | Photo curable inkset | Radical polymerization-preventing liquid composition | Cap | Wiper | Ink absorbent | Waste liquid pump |
|---|---|---|---|---|---|---|
| Comp. Ex. 9 | 3 | 13 | C | C | C | B |

According to the above results, the liquid composition according to the present invention was determined to be useful as a liquid composition used for the purpose of maintenance that maintains the performance of an ink jet printing apparatus.

The invention claimed is:

1. An ink jet recording method for an inkjet recording apparatus, comprising:
   discharging a droplet of a photo curable ink composition onto a recording medium;
   curing the droplet discharged onto the recording medium by irradiating an ultraviolet light; and
   attaching a liquid composition to the inkjet recording apparatus,
   wherein the liquid composition comprises a radical polymerization inhibitor,
   the content of the radical polymerization inhibitor is 0.1-50 wt. % of a total weight of the liquid composition, and
   the radical polymerization inhibitor is at least one type of compound selected from hydroquinones, catechols, hindered amines, phenols, phenothiazines, and quinones of condensed aromatic rings.

2. The ink jet recording method of claim 1, wherein the location to which the liquid composition is attached is at least one of a cap, wiper, ink absorber, or tube pump of the inkjet recording apparatus.

3. The ink jet recording method of claim 1, wherein the content of the radical polymerization inhibitor is 3-30 wt. % of a total weight of the liquid composition.

4. The ink jet recording method of claim 1, wherein the photo curable ink composition contains an amine compound.

* * * * *